United States Patent
Koontz (10) Patent No.: US 9,822,877 B2
(45) Date of Patent: Nov. 21, 2017

(54) LIGHTWEIGHT COMPRESSOR PISTON WITH OPENING

(71) Applicant: Ariel Corporation, Mount Vernon, OH (US)

(72) Inventor: Evan William Koontz, Howard, OH (US)

(73) Assignee: ARIEL CORPORATION, Mount Vernon, OH (US)

(*) Notice: Subject to any disclaimer, the term of this patent is extended or adjusted under 35 U.S.C. 154(b) by 761 days.

(21) Appl. No.: 14/028,054

(22) Filed: Sep. 16, 2013

(65) Prior Publication Data
US 2015/0075368 A1    Mar. 19, 2015

(51) Int. Cl.
*F16J 1/02* (2006.01)
*F16J 1/12* (2006.01)
*F16J 1/00* (2006.01)

(52) U.S. Cl.
CPC .......... *F16J 1/12* (2013.01); *F16J 1/005* (2013.01); *F16J 1/02* (2013.01); *Y10T 29/49252* (2015.01)

(58) Field of Classification Search
CPC ..................................... F16J 1/005; F16J 1/02
See application file for complete search history.

(56) References Cited

U.S. PATENT DOCUMENTS

| | | | | |
|---|---|---|---|---|
| 1,180,536 A | * | 4/1916 | Pownall | F04B 39/0016 137/516.21 |
| 2,628,872 A | * | 2/1953 | Moore | F15B 3/00 92/113 |
| 2,980,476 A | * | 4/1961 | Harrison | F16J 1/005 92/260 |
| 3,678,809 A | * | 7/1972 | Doutt | F04B 53/143 277/436 |
| 5,658,134 A | | 8/1997 | Gagnon et al. | |

FOREIGN PATENT DOCUMENTS

| | | |
|---|---|---|
| EP | 0 498 980 B1 | 9/1994 |
| EP | 0 576 133 B1 | 9/1996 |
| EP | 0 839 280 B1 | 8/1999 |

OTHER PUBLICATIONS

Lau G.M. Koop, "Free Floating Piston Case History of Revamp of Existing Compressors", 4th Conference of the EFRC Jun. 9-10, 2005, pp. 85-91.

* cited by examiner

Primary Examiner — F. Daniel Lopez
(74) Attorney, Agent, or Firm — Squire Patton Boggs (US) LLP (57) ABSTRACT

A piston may be provided which includes a first piston body portion having an end wall extending radially about a central axis along which the piston reciprocates. The piston may also include a second piston body portion having an end wall extending radially about a central axis along which the piston reciprocates. The first piston body portion and the second piston body portion are axially opposed. The piston may further include a first piston rod bore disposed in the first piston body portion extending along the central axis and a second piston rod bore disposed in the second piston body portion extending along the central axis. The piston may also include a circumferential opening disposed between the mating of the first piston body portion with the second piston body portion.

12 Claims, 7 Drawing Sheets

LIGHTWEIGHT COMPRESSOR PISTON WITH OPENING

BACKGROUND

Field

Various compressor systems may benefit from a lightweight compressor piston with a circumferential opening. For example, a piston type, positive displacement, reciprocating gas compressor may benefit from a compressor piston that reduces reciprocating weight.

Description of the Related Art

Manufacturers of piston type reciprocating gas compressors may produce pistons which are very heavy and their weight may prohibit them from achieving all of their goals for the devices. These pistons may be restrictive due to being heavy.

A double-acting compressor piston may be defined as a positive displacement piston that compresses gas on both the crank end (CE) and head end (HE) of the piston inside of a cylinder with a single main bore. A CE compression chamber is located closest to the crankshaft and a HE compression chamber is located closest to the head-end (farthest from the crankshaft). Both CE and HE compression chambers reside in the same cylinder. The cylinder has one main bore. When the piston moves towards the CE it compresses gas on the CE while creating suction on the HE. When the piston moves towards the HE it compresses the gas on the HE while creating suction on the CE. The process cycles reciprocally.

Some currently employed pistons are heavy enough to have speed restrictions. The speed restrictions may prevent operators from operating the compressors at their full rated speed.

A crosshead is the component of the drive train that is connected to both the connecting rod and the piston rod. The crosshead transfers the rotary/reciprocating motion of the connecting rod into a pure reciprocating motion for the piston rod. The heavy pistons may require extra heavy and extra light crossheads to balance a pair of opposing compressor throws.

The extra heavy crosshead may be very heavy and difficult for a mechanic to install, and it may also be very expensive. The extra light crosshead may be made from a material that requires special processes to manufacture and can be difficult to control the quality.

If the piston is of a multi-piece construction the piston ribs may need to be preloaded in tension to provide enough clamping force at the O.D. to prevent the O.D. contact from moving (relative motion between the two surfaces) causing contact damage. Contact damage constitutes any kind of galling, fretting, erosion of material or the like (surface failure). To preload the piston ribs, a small, approximately 0.010 inch gap, for example, may be machined into the hub between two mating surfaces so that when the piston nut is tightened the gap is closed creating a clamping force at the O.D. The preload creates a tensile stress in the ribs which must be accounted for in the fatigue safety factor. In other words, the tensile stress in the ribs from preload makes the piston weaker in fatigue.

Pistons are typically designed after the cylinder has been designed and the distance between crank end (CE) head and head end (HE) head has been established. Sometimes it is a struggle to fit enough piston rings and wear bands on the piston, and other times there is too much piston length for the recommended number of piston rings and the appropriate width of wear band. In the situation where there is excessive length on the piston engineers typically put extra piston rings on the piston. It is assumed (but not verified) that each piston ring breaks between 30% to 50% of the differential pressure to which it is exposed.

It is known that conventional, hollow, double-acting pistons fill with gas. The gas works its way inside the hollow piston over time through the asperities on the contact surfaces of the mating pieces of the piston. The gas pressure inside the piston is assumed to be between suction and discharge pressure (mean pressure). Gas pressure filling the inside of the piston is accounted for in the fatigue safety factor calculation.

Further, conventional hollow, double-acting pistons may have an o-ring seal at the O.D. that is intended to prevent oil/liquids from filling the piston. If oil/liquids fill the piston, the oil/liquids will cause an imbalance in reciprocating weight between a pair of opposing throws resulting in undesirable vibration. Oil/liquids that get inside the piston tend to stay inside the piston causing excessive vibration.

SUMMARY

According to a first embodiment, a piston may be provided which includes a first piston body portion having an end wall extending radially about a central axis along which the piston reciprocates. The piston may also include a second piston body portion having an end wall extending radially about a central axis along which the piston reciprocates. The first piston body portion and the second piston body portion are axially opposed. The piston may further include a first piston rod bore disposed in the first piston body portion extending along the central axis and a second piston rod bore disposed in the second piston body portion extending along the central axis. The piston may also include a circumferential opening disposed between the mating of the first piston body portion with the second piston body portion.

According to a second embodiment, a method of constructing a piston. The method may include providing a first piston body portion having an end wall extending radially about a central axis along which the piston reciprocates. The method may also include providing a second piston body portion having an end wall extending radially about a central axis along which the piston reciprocates, wherein the first piston body portion and the second piston body portion are axially opposed. The method may further include providing a first piston rod bore disposed in the first piston body portion extending along the central axis and providing a second piston rod bore disposed in the second piston body portion extending along the central axis. The method may also include forming a circumferential opening disposed between the mating of the first piston body portion with the second piston body portion.

BRIEF DESCRIPTION OF THE DRAWINGS

For proper understanding of the invention, reference should be made to the accompanying drawings, wherein.

DETAILED DESCRIPTION

The components of the present invention, as generally described and illustrated in the figures herein, may be arranged and designed in a wide variety of different configurations. Thus, the following more detailed description of the embodiments of the apparatus, system, and method of the present invention, as represented in the attached figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention.

Thus, appearances of the phrases "in certain embodiments," "in some embodiments," "in other embodiments," or similar language throughout this specification do not necessarily all refer to the same group of embodiments and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention may include piston component/features, such as, hubs, ribs, end walls, and outer diameter (O.D.). In certain embodiments, the pistons may be hollow in the sense that there is a cavity of volume inside the piston to remove weight. Some embodiments are configured as hollow, double-acting compressor pistons which can be a single piece or multi-piece design. In some embodiments, the multi-piece design includes a plurality of pieces, for example, two, three, four or more pieces. These pistons may typically be a casting made from gray iron or ductile iron. They can also be made from steel, aluminum, a combination of multiple materials, or any other suitable material.

The piston is connected to a piston rod. There are several methods with which a piston can be attached to the piston rod.

In certain embodiments the piston houses piston rings and wear bands (not shown) in grooves on the O.D. of the piston. The piston rings do the sealing, while the wear bands prevent the piston from touching the cylinder bore (not shown). The wear bands are not intended to seal gas.

Certain embodiments of the invention describe a lightweight, double-acting compressor piston with a circumferential opening at the outer diameter.

Figure 1:
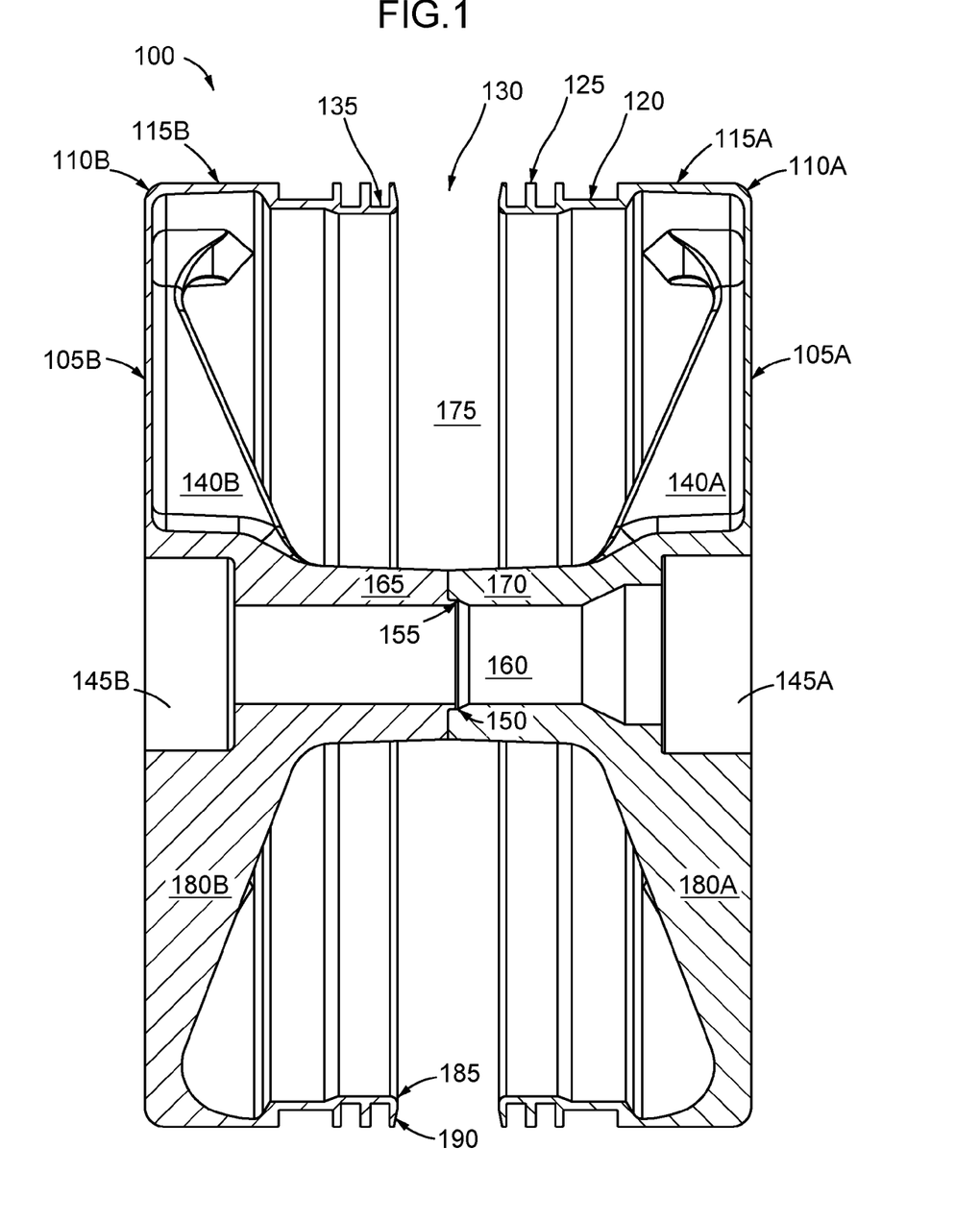
FIG. 1 illustrates a cross-sectional view of a piston according to certain embodiments of the invention.

FIG. 1 illustrates a cross-sectional view of a piston 100 according to certain embodiments of the invention. In FIG. 1, piston 100 includes a head end (HE) piston half 105A having an end wall and a corner radius 110A. HE piston half 105A extends from a central axis along which piston 100 reciprocates to an outer diameter (O.D.) 115A of piston 100. Piston 100 also includes a crank end (CE) piston half 105B having an end wall and a corner radius 110B. CE piston half 105B also extends from the central axis along which piston 100 reciprocates to an outer diameter (O.D.) 115B of piston 100.

HE piston half 105A includes a wear band groove 120 configured to accommodate a wear band (not shown) and a plurality piston ring grooves (similar to 135) separated by a land 125 configured to accommodate piston rings (not shown). HE piston half 105A may also include support ribs 140A and 180A (shown in cross-section) disposed within an internal hollow piston cavity 175 and configured to strengthen HE piston half 105A. Within hollow piston cavity 175, HE piston half 105A further includes a hub 170 configured with a female spigot 150 at the central axis. HE piston half 105A may also include a piston nut counter bore 145A disposed along the central axis proximal the end wall of HE piston half 105A and coaxial with a piston rod bore 160. In other embodiments, support ribs 140A and 180A may be omitted from HE piston half 105A.

CE piston half 105B includes a wear band groove (similar to 120) configured to accommodate a wear band (not shown) and a plurality piston ring grooves 135 separated by a land (similar to 125) configured to accommodate piston rings (not shown). CE piston half 105B may also include support ribs 140B and 180B (shown in cross-section) disposed within internal hollow piston cavity 175 and configured to strengthen CE piston half 105B. Within hollow piston cavity 175, CE piston half 105B further includes a hub 165 configured with a male pilot 155 at the central axis. CE piston half 105B may also include a piston collar counter bore 145B disposed along the central axis proximal the end wall of CE piston half 105B and coaxial with piston rod bore 160. In other embodiments, support ribs 140B and 180B may be omitted from HE piston half 105B.

Piston rod bore 160 is configured to pass from piston collar counter bore 145B of CE piston half 105B to piston nut counter bore 145A of HE piston half 105A along the central axis of piston 100. Male pilot 155 and female spigot 150 are configured to mate upon assembly of piston 100 with HE piston half 105A and CE piston half 105B joined. Once mated, internal hollow piston cavity 175 will result in a circumferential opening 130 at the O.D. of piston 100. At circumferential opening 130 and adjacent to piston ring groove 135 may be disposed a bevel 190 having a radius of curvature 185. The edges of circumferential opening 130 may be beveled to help deflect oil/liquid back towards the cylinder bore and away from entering hollow piston cavity 175. Any oil/liquid that enters hollow piston cavity 175 through circumferential opening 130 is free to migrate out the bottom of circumferential opening 130 and be wiped away by piston rings (at 135). Bevel 190 and radius 185 may create the boundary of circumferential opening 130 and helps to keep oil out of hollow piston cavity 175 by deflecting the oil back towards the cylinder bore (not shown). Bevel 190 also thins out the material of land 125 holding the ring closest to circumferential opening 130, thus removing any excess weight.

In other words, in certain embodiments, piston 100 is self-bailing with regards to oil/liquid. This means that piston 100 does not trap/hold enough oil/liquid to create an imbalance in reciprocating weight between opposing throws. Thus, piston 100 does not require an o-ring to keep oil/liquid out of the piston, thus saving machining and costs. Further, the geometry of bevel 190 and radius 185 which creates the boundary of circumferential opening 130 can have various shapes and angles or combinations thereof or may be omitted from piston 100 in certain embodiments.

Piston 100 is unique in that it has circumferential opening 130 at the outer diameter (115A, 115B) of piston 100 that exposes the inside cavity 175 of piston 100 to the main cylinder bore. Circumferential opening 130 allows weight reduction for two reasons. First, circumferential opening 130 removes piston material at the O.D. (115A, 115B) that is not necessary to house the appropriate quantity/size of piston rings and wear bands (not shown). Second, circumferential opening 130 eliminates the contact between multi-piece piston ends at the O.D. (115A, 115B) that previously required some pistons to be stiff and strong enough to prevent contact damage at the O.D. contact, thus being lighter.

Circumferential opening 130 removes unnecessary piston material at the O.D. which reduces the weight of piston 100. The O.D. of the piston typically constitutes the heaviest portion of the piston. Since piston 100 ends at bevel 190 do not touch at the O.D. contact, piston 100 does not need to be stiff or strong enough to resist contact damage, so it may be made lighter in weight.

Circumferential opening 130 is located at or near the middle of the stack of piston rings where the pressure in the stack is at or near the same pressure that is inside internal hollow piston cavity 175. This results in little or no flow of gas in and out of circumferential opening 130 which minimizes any effects of fixed clearance.

If there is a mismatch in pressure between the point in the stack where circumferential opening 130 is located and hollow piston cavity 175, that the speed of piston 100 is so fast that the gas that leaks past piston rings (at 135) does not have time to enter and exit hollow piston cavity 175 nullifying the effects of any fixed clearance.

Figure 2:
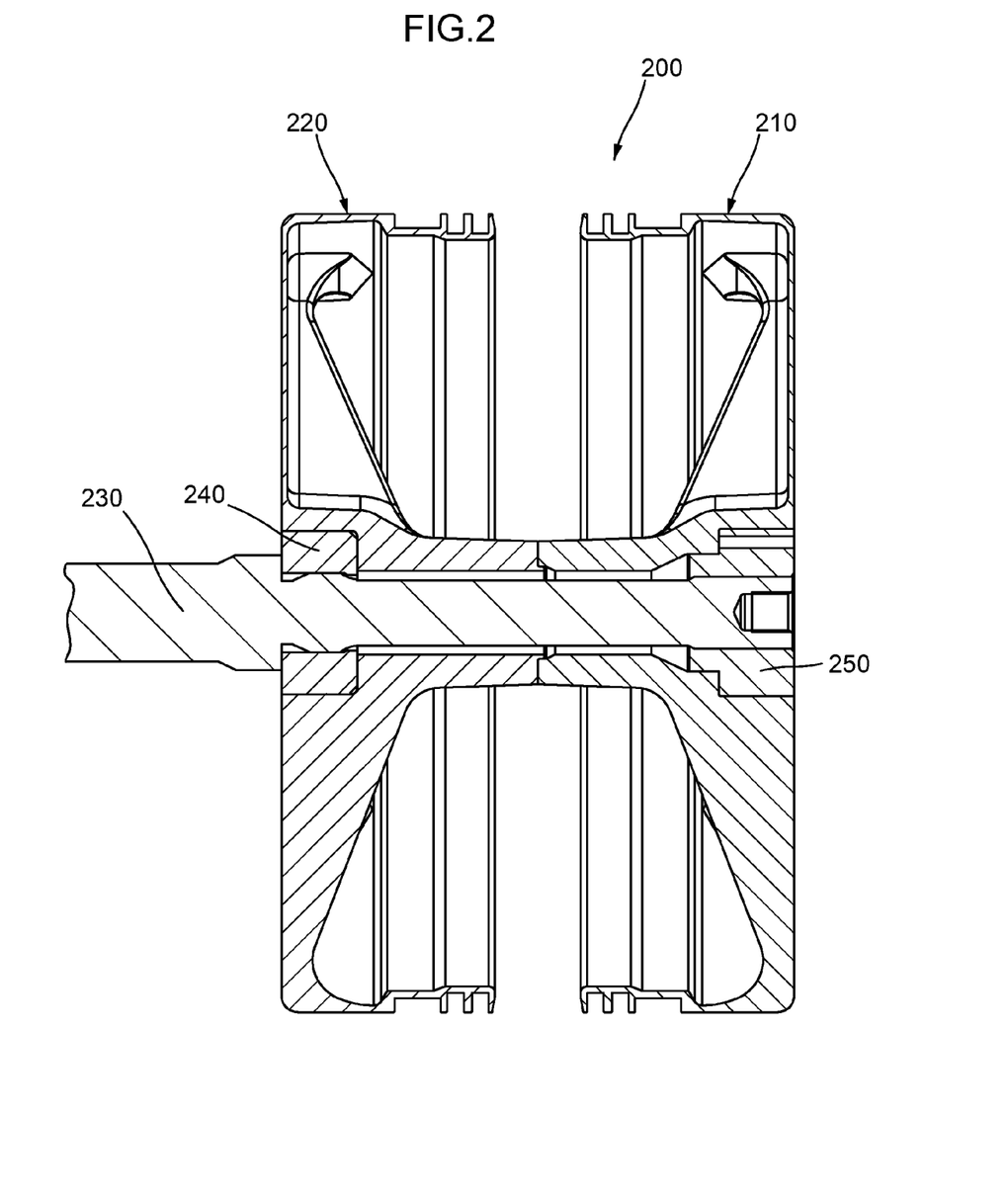
FIG. 2 illustrates a cross-sectional view of a piston assembly according to certain embodiments of the invention.

FIG. 2 illustrates a cross-sectional view of a piston assembly 200 according to certain embodiments of the invention. In FIG. 2, a piston configured similarly to that of FIG. 1 having a head end (HE) piston half 210 and a crank end (CE) piston half 220 are mated together about a piston rod 230 via a piston collar 240 disposed in CE piston half 220 and a piston nut 250 disposed in HE piston half 210. Piston nut 250 may be configured to threadably attach to piston rod 230.

Figure 3:
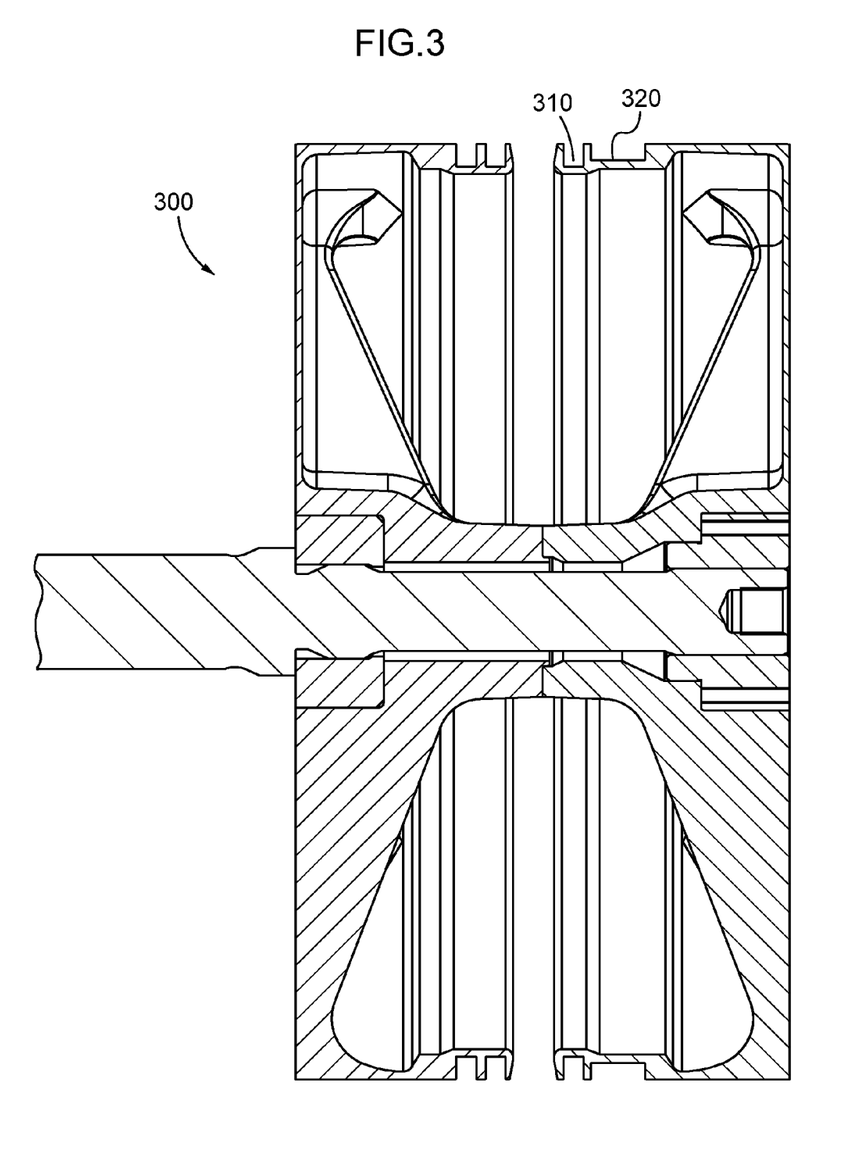
FIG. 3 illustrates a cross-sectional view of an alternative piston assembly according to certain embodiments of the invention.

FIG. 3 illustrates a cross-sectional view of an alternative piston assembly 300 according to certain embodiments of the invention. In FIG. 3, another embodiment is shown which shows a different configuration for a piston ring groove 310 and wear band groove 320 disposed on the HE piston half and no wear band on the CE piston half.

Figure 4:
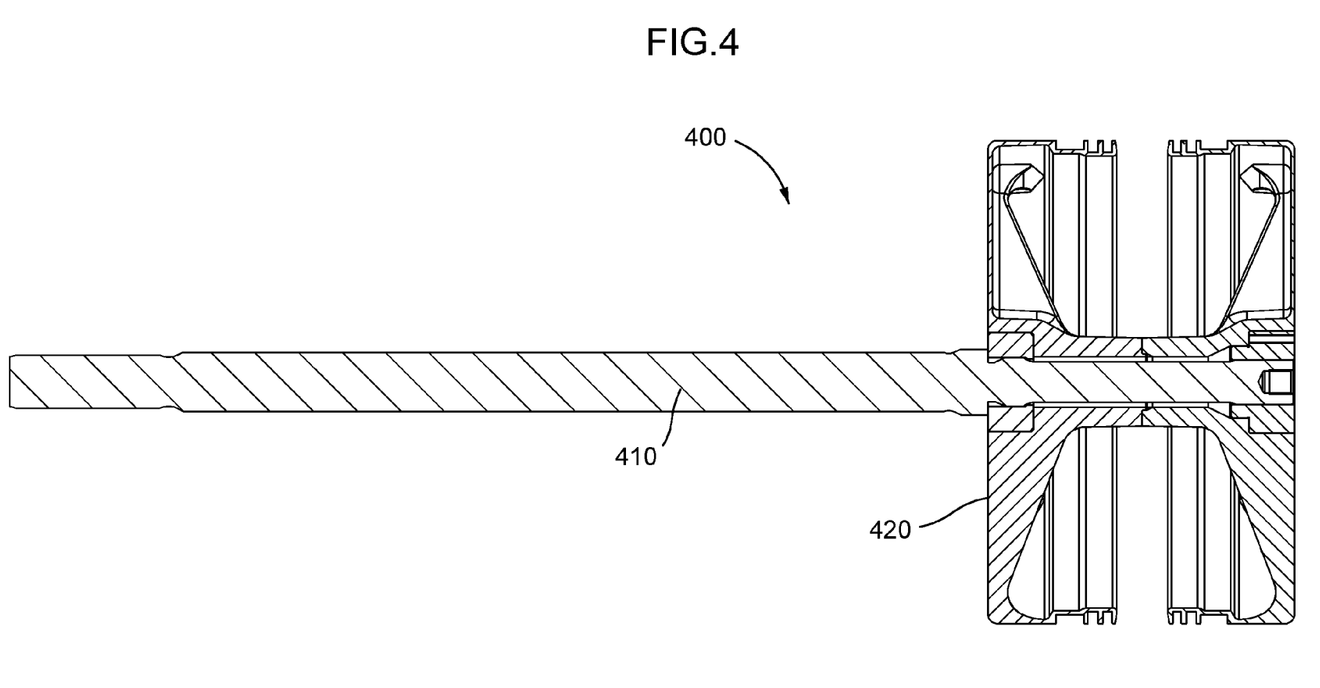
FIG. 4 illustrates an expanded cross-sectional view of a piston assembly according to certain embodiments of the invention.

FIG. 4 illustrates an expanded cross-sectional view of a piston assembly 400 according to certain embodiments of the invention. In FIG. 4, piston assembly 400 may include piston rod 410 and piston 420 configured similarly to that of FIG. 1.

Figure 5:
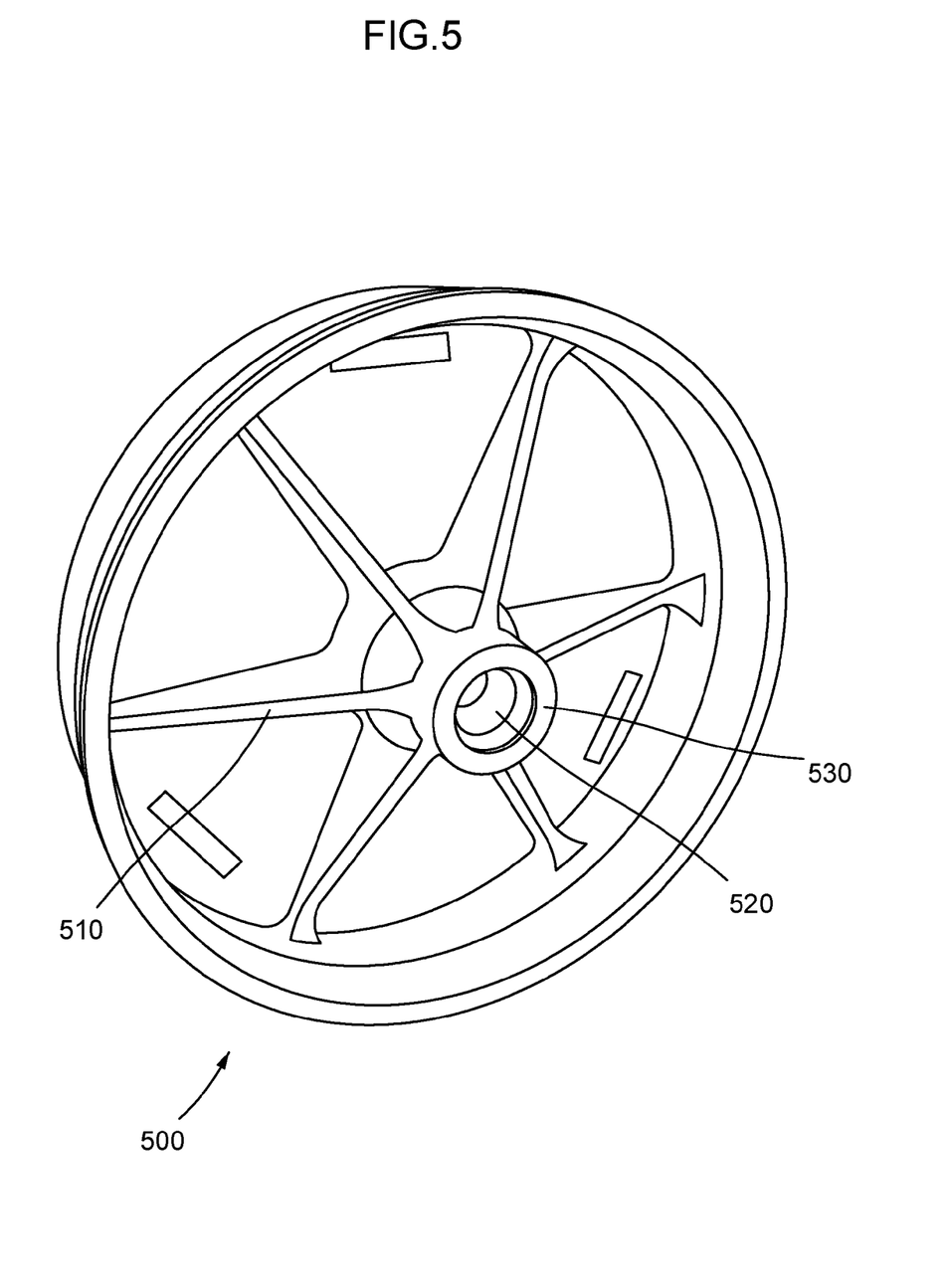
FIG. 5 illustrates a perspective view of an internal hollow piston cavity portion according to certain embodiments of the invention.

FIG. 5 illustrates a perspective view of an internal hollow piston cavity portion according to certain embodiments of the invention. In FIG. 5, HE piston half 500 may include support ribs 510 similar to those described above in FIG. 1. HE piston half 500 may also include a piston rod bore 520 and a hub 530 having a female spigot as similarly described in FIG. 1. Support ribs 510 may be configured to be integral to HE piston half 500 and disposed within the internal hollow piston cavity as shown.

Figure 6:
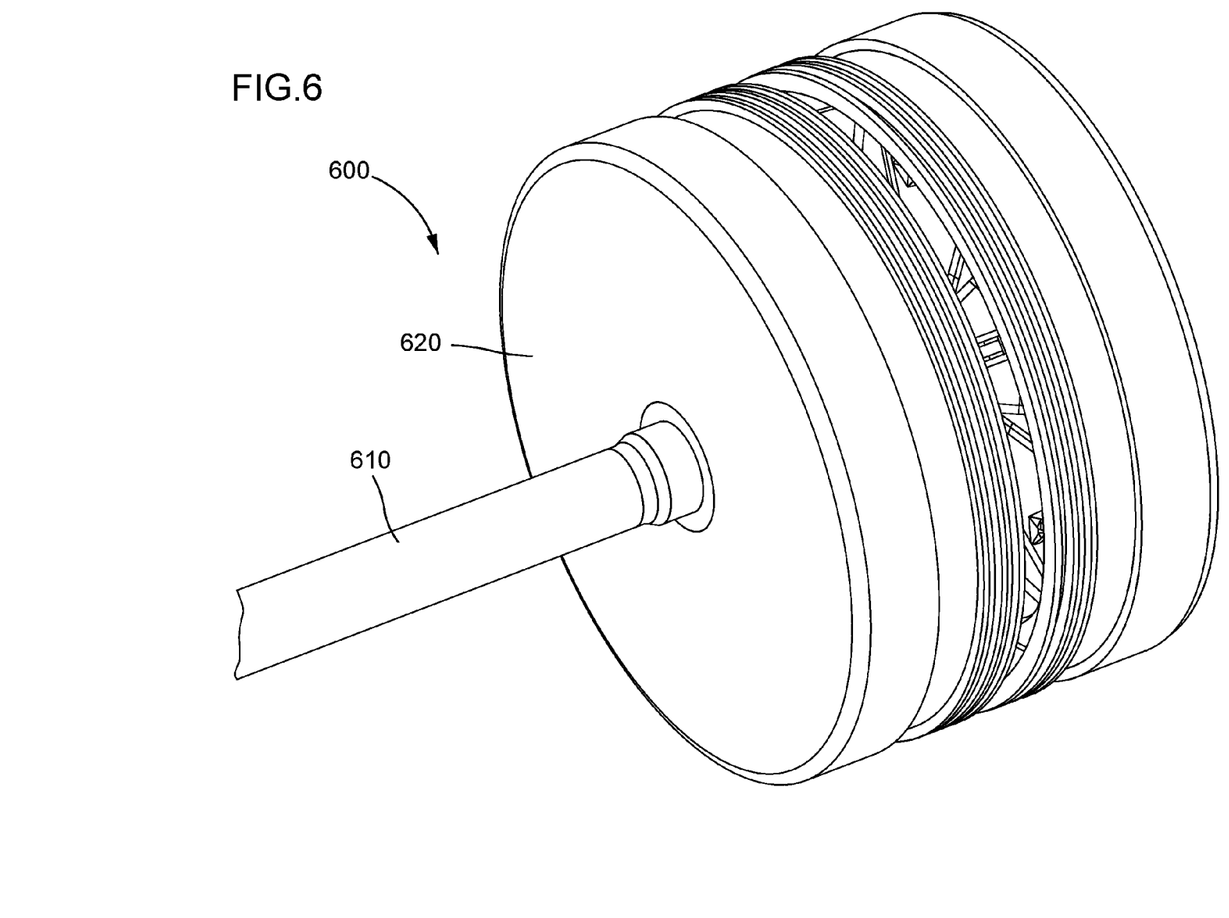
FIG. 6 illustrates a perspective view of the piston assembly of FIGS. 1 and 2 according to certain embodiments of the invention.

FIG. 6 illustrates a perspective view of the piston assembly of FIG. 2 according to certain embodiments of the invention. In FIG. 6, piston assembly 600 includes a piston rod 610 and piston 620 having a plurality of piston ring grooves and wear bands as similarly described in FIGS. 1 and 2 above.

Figure 7:
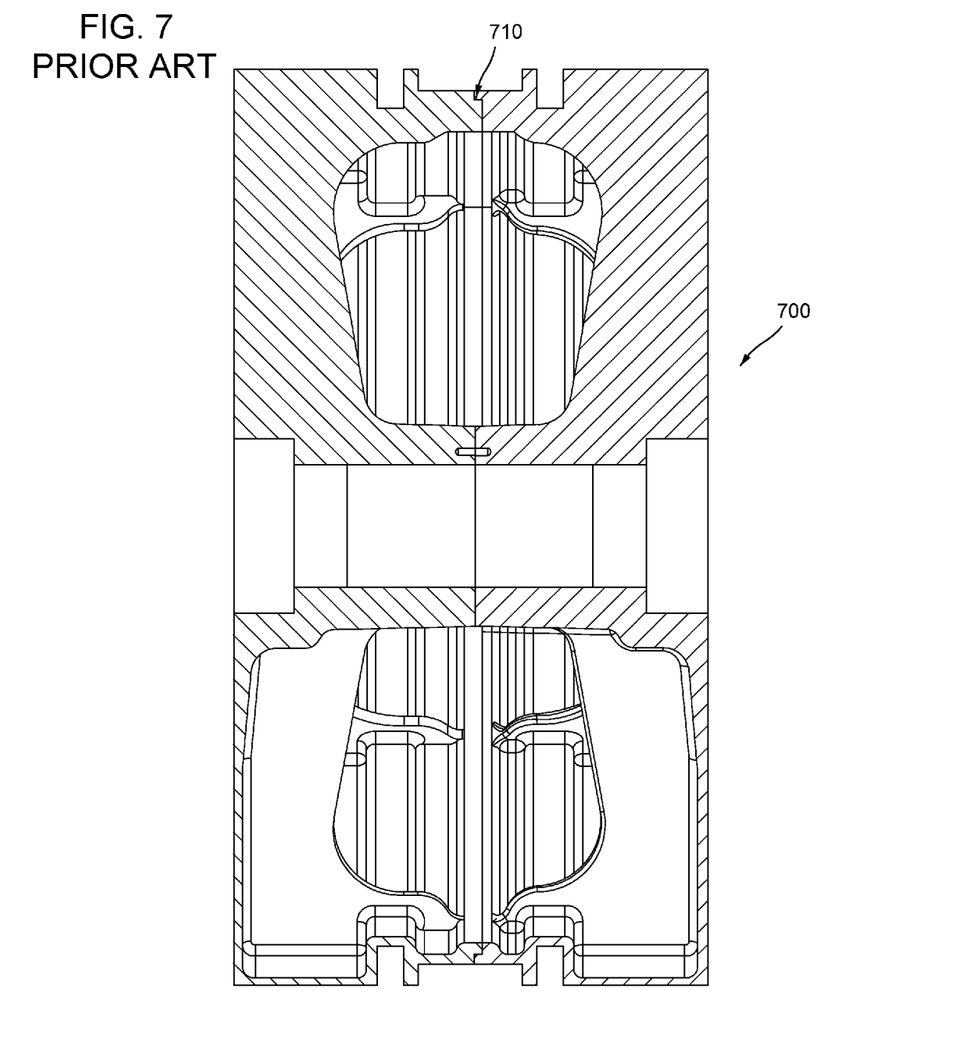
FIG. 7 illustrates a cross-sectional view of a conventional piston.

FIG. 7 illustrates a cross-sectional view of a conventional piston. In FIG. 7, a conventional hollow piston 700 having the need for an o-ring seal 710 to keep oil out of piston 700. Thus, conventional hollow, double-acting pistons may have o-ring seal 710 at the O.D. which is intended to prevent oil/liquids from filling piston 700. However, if oil/liquids fill piston 700, the oil/liquids will cause an imbalance in reciprocating weight between a pair of opposing throws resulting in undesirable vibration.

Alternatively, certain embodiments of the invention can be of a single-piece or multi-piece piston arrangement. If the piston is a single-piece design the statements relating to the elimination of the contact at the O.D. are moot because the contact never existed in the first place.

Certain embodiments of the invention are not specific to weight, diameter or length of the piston. Certain embodiments of the invention are not specific to the method of attachment to the piston rod. The attachment could be any of a through bolt, multi-stud, shrink fit, press fit, friction weld, composite bonded, etc.

Certain embodiments of the invention may be a double-acting piston used in a double-acting cylinder, but it can be single-acted by de-activating one end of the cylinder with suction valve unloaders or other unloading devices or methods. Certain embodiments of the invention are not specific to materials or method of construction. Certain embodiments of the invention are not specific to quantity, location or size of piston rings and wear bands relative to the circumferential opening.

Certain embodiments of the invention can have piston rings (at 135) and wear bands (at 120) removed from one side of the circumferential opening to add fixed clearance in an effort to add more capacity control. However, a re-balance may be required. It may be preferred to remove the rings and wear bands on the head end side to prevent crosshead pin non-reversal. Certain embodiments of the invention are not specific to the working pressure or temperature inside the cylinder. Certain embodiments of the invention are not specific to size of the circumferential opening.

Certain embodiments of the invention are applicable to a piston type reciprocating gas compressor (not shown). Certain embodiments of the invention can be used in lubricated cylinders or non-lube cylinders (oil-free). More specifically the invention is applicable to double-acting, hollow pistons in a single compressor cylinder bore where the piston is axially longer than necessary to house an appropriate quantity/size of piston rings and wear bands. Certain embodiments of the invention can be used for any of the reasons by which lighter weight is beneficial.

Some advantages according to certain embodiments may include a reduction in reciprocating weight of the drive train (not shown) which may allow for speed restricted cylinders with heavy pistons to run at higher RPM (i.e., faster); allow non-speed restricted cylinders to operate at a higher RPM (i.e., faster); lower reciprocating weight increases bearing minimum oil film thickness (MOFT) which leads to longer bearing life; and reduce enough weight to eliminate the need for extra heavy and extra light crossheads. The extra heavy crosshead is typically used on the opposing throw from a very heavy piston to balance a pair of opposing throws. The extra light crosshead is typically used on the same throw as a very heavy piston to balance a pair of opposing throws. The extra heavy crossheads are undesirable because it is heavy, difficult for the mechanic to handle and very expensive. The extra light crossheads are typically made from a material that requires very specific manufacturing processes that can be hard to control. Further, lighter weight pistons are easier to handle and assemble.

Since in a multi-piece arrangement of the invention, the piston components do not make contact at the O.D., the ribs are not preloaded in tension. Since the ribs are not preloaded in tension, the fatigue safety factor is higher. Also, keeping the same allowable fatigue safety factor the lack of tensile pre-stress in the ribs allows the ribs to be smaller and lighter in weight.

As discussed in certain embodiments, in a multi-piece arrangement of the invention, the piston components do not make contact at the O.D., so the piston does not need to be designed to prevent contact damage at that contact. Resulting in the piston not needing to be as stiff and thus lighter in weight.

Other advantages according to certain embodiments are that the opening at the O.D. removes weight from the piston in the portion of the piston that typically constitutes the highest percentage of weight of the piston. In other words, the elimination of material at the O.D. is a highly effective way to remove weight. Also, since the piston components do not touch at the O.D., there is no need for an alignment pin to align the ribs of each piston end. Thus, there is no alignment pin in some embodiment of the invention. The lack of an alignment pin eliminates a manufacturing process to drill the holes thereby saving costs. Further, in some embodiments of the invention, the piston requires less machining if made from a casting and thus is lower in cost. In other words, the material that has been removed at the circumferential opening would have been machined.

According to certain embodiments of the invention, the piston is self-venting with regards to gas (for safety). This means that when the compressor is shut down and blown down the piston cannot trap pressurized gas posing a danger to mechanic that disassembles the piston. The gas inside the piston will be at atmospheric pressure. In other words, the mechanic may not be exposed to pressurized gas when he or she disassembles any piston. The piston is self-venting without the need to drill a hole in the piston to make it self-venting. A drilled hole requires an additional manufacturing process and would add cost. This design is self-venting with minimal cost.

According to certain embodiments the gas that leaks past piston rings (at 135) from the compression chamber (not shown) and is exposed to the volume inside piston 100 does not affect the efficiency of the compressor (not shown). In other words, the volume inside piston 100 does not act as fixed clearance. In some embodiments, the volume inside piston 100 does not retain a significant amount of oil/liquid. In other words, piston 100 does not hold enough oil/liquid to cause an imbalance in reciprocating weight that generates undesirable vibration during operation.

Fixed clearance is a volume inside the compression chamber that is not displaced by piston 100. It is known that fixed clearance in a compression chamber reduces the displacement of the compressor (generally not desirable). The gas that occupies the fixed clearance is compressed and re-expanded, never actually moving out of the compression chamber, but yet requiring horsepower to do so, thus reducing efficiency.

It is known that a single piston ring does not provide a complete seal. The piston ring has an end gap to allow for installation and for thermal expansion which is a leak path for gas. There are also small asperities in the sealing surfaces of the piston ring and cylinder bore that allow for a leak path.

In certain embodiments of the invention gas will get past the piston rings from the compression chamber and be exposed to the volume that creates and defines the inside of the piston. In conventional hollow pistons this would result in a reduction in efficiency but that is not the case in certain embodiments of the invention. In other words, piston 100 does not result in a reduction in efficiency.

When the oil/liquid that comes in with the gas being exposed to the volume that creates and defines the inside of piston 100 having piston rings on either side of circumferential opening 130, and circumferential opening 130 being only a small portion of the axial length of piston 100 minimizing the area through which oil/liquid could exit, the oil/liquid should be trapped inside piston 100 creating an imbalance in reciprocating weight, but this is not the case. According to certain embodiments, the configuration of piston 100 does not trap enough oil/liquid to cause an imbalance in reciprocating weight.

Since no usable work can be done in the volume that creates and defines the inside of the piston, conventional wisdom says that it should be sealed.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A piston, comprising:
   a first unitary piston body portion having an end wall extending radially about a central axis along which the piston reciprocates;
   a second unitary piston body portion having an end wall extending radially about a the central axis along which the piston reciprocates, wherein the first piston body portion and the second piston body portion are axially opposed;
   a first piston rod bore disposed within a first hub in the first unitary piston body portion extending along the central axis; and
   a second piston rod bore disposed within a second hub in the second unitary piston body portion extending along the central axis,
   wherein the first unitary piston body portion and the second unitary piston body portion are configured to mate at the first hub and the second hub,
   wherein an opening is formed radially about the central axis, between the first unitary piston body portion with the second unitary piston body portion,
   wherein one side of the opening is unblocked,
   wherein the first unitary piston body portion includes a piston ring groove and the second unitary piston body portion includes a plurality of piston ring grooves disposed along an outer diameter of each piston body portion proximal the opening, wherein the first unitary piston body portion includes a wear band groove disposed along the outer diameter adjacent the piston ring groove, and wherein the second unitary piston body portion does not include a wear band groove.

2. The piston of claim 1, wherein the first unitary piston body portion and the second unitary piston body portion each are configured with a plurality of inner support ribs radially extending from the first hub and second hub, respectively.

3. The piston of claim 1, wherein the opening is at least partially formed by the mating of the first hub and the second hub.

4. The piston of claim 1, wherein the first hub comprises a female spigot and the second hub comprises a male pilot, and wherein the female spigot and the male pilot are configured to mate together.

5. The piston of claim 1, wherein the first piston rod bore includes a piston nut counter bore disposed proximal its end wall.

6. The piston of claim 1, wherein the second piston rod bore includes a piston collar counter bore disposed proximal the end wall of the second unitary piston body portion.

7. The piston of claim 1, wherein the first unitary piston body portion and the second unitary piston body portion are configured to form an internal hollow piston cavity proximal the opening.

8. The piston of claim 1, wherein the opening is bound by a first bevel disposed at the outer diameter of the first unitary piston body portion and a second bevel disposed at the outer diameter of the second unitary piston body portion.

9. The piston of claim 1, wherein a piston rod having a head end and a crank end is attached to the first unitary piston body portion or the second unitary piston body portion, and wherein the first unitary piston body portion is located at the head end of the piston rod and the second unitary piston body portion is located near the crank end of the piston rod.

10. The piston of claim 9, wherein the first unitary piston body portion comprises a piston nut counter bore configured to accommodate a piston nut.

11. The piston of claim 9, wherein the second unitary piston body portion comprises a piston collar counter bore configured to accommodate a piston collar.

12. The piston of claim 1, wherein support ribs are absent from at least the first unitary piston body portion or the second unitary piston body portion.

* * * * *